(12) United States Patent
Baya Toda et al.

(10) Patent No.: US 11,162,422 B2
(45) Date of Patent: Nov. 2, 2021

(54) COMBUSTION CHAMBER WITH A HOT COMPRESSED AIR DEFLECTOR, IN PARTICULAR FOR A TURBINE INTENDED FOR PRODUCING ENERGY, IN PARTICULAR ELECTRICAL ENERGY

(71) Applicant: IFP Energies nouvelles, Rueil-Malmaison (FR)

(72) Inventors: Hubert Baya Toda, Paris (FR); Jean-Baptiste Michel, Rueil Malmaison (FR); Thomas Valin, Vincennes (FR); Julien Thiriot, Rueil Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 181 days.

(21) Appl. No.: 16/328,764

(22) PCT Filed: Jul. 11, 2017

(86) PCT No.: PCT/EP2017/067434
§ 371 (c)(1),
(2) Date: Feb. 27, 2019

(87) PCT Pub. No.: WO2018/041455
PCT Pub. Date: Mar. 8, 2018

(65) Prior Publication Data
US 2019/0195130 A1 Jun. 27, 2019

(30) Foreign Application Priority Data
Aug. 29, 2016 (FR) ...................................... 1657991

(51) Int. Cl.
*F02C 7/10* (2006.01)
*F23R 3/02* (2006.01)
*F02K 3/00* (2006.01)

(52) U.S. Cl.
CPC .................. *F02C 7/10* (2013.01); *F02K 3/00* (2013.01); *F23R 3/02* (2013.01)

(58) Field of Classification Search
CPC .... F23R 3/002; F23R 3/04; F23R 3/10; F23R 3/16; F23R 3/54; F23R 3/02; F02C 7/08; F02C 7/10
See application file for complete search history.

(56) References Cited

U.S. PATENT DOCUMENTS 2,458,497 A * 1/1949 Bailey ..................... F23R 3/002
432/223
3,360,929 A * 1/1968 Drewry ................... F23R 3/286
60/743

(Continued)

FOREIGN PATENT DOCUMENTS

| FR | 1503456 A | 11/1967 |
| FR | 1559314 A | 3/1969 |
| WO | 2012/039611 A1 | 3/2012 |

OTHER PUBLICATIONS

International Search Report for PCT/EP2017/067434, dated Sep. 8, 2017; English translation submitted herewith (5 pgs.).

*Primary Examiner* — Gerald L Sung
(74) *Attorney, Agent, or Firm* — Fitch, Even, Tabin & Flannery, LLP

(57) ABSTRACT

The present invention relates to a combustion chamber (10) of a turbine, in particular a turbine with a thermodynamic cycle comprising a recuperator, for producing energy, in particular electrical energy, comprising a casing (12) with an injection means (52) for injecting at least one fuel, and a hot compressed air intake (32), said casing housing a flame tube (22) with a perforated diffuser (26) for the passage of the hot compressed air and the fuel, and a flame stabiliser (54). According to the invention, the chamber comprises an air deflector (36) arranged facing the hot compressed air intake (Continued)

(32) in order to circulate this hot air in a single axial direction from this intake.

6 Claims, 1 Drawing Sheet

(56) References Cited

U.S. PATENT DOCUMENTS

| | | | |
|---|---|---|---|
| 3,563,073 A | 2/1971 | Fischer | |
| 4,050,238 A * | 9/1977 | Holzapfel | F23R 3/10 60/39.23 |
| 4,085,579 A | 4/1978 | Holzapfel et al. | |
| 4,211,073 A * | 7/1980 | Guillot | F23R 3/04 60/746 |
| 4,297,842 A * | 11/1981 | Gerhold | F23R 3/02 60/39.55 |
| 4,399,652 A * | 8/1983 | Cole | F02C 3/22 60/39.465 |
| 4,474,014 A * | 10/1984 | Markowski | F23R 3/14 60/738 |
| 4,896,510 A * | 1/1990 | Foltz | F23R 3/002 60/757 |
| 5,079,911 A * | 1/1992 | Kumakura | F02C 7/08 60/39.511 |
| 5,333,458 A * | 8/1994 | Loving | F23R 3/42 431/353 |
| 5,609,655 A * | 3/1997 | Kesseli | F23C 7/002 48/180.1 |
| 6,209,325 B1 * | 4/2001 | Alkabie | F23C 6/047 60/737 |
| 6,341,485 B1 * | 1/2002 | Liebe | F23R 3/005 60/772 |
| 2002/0172905 A1 * | 11/2002 | Ruck | F23C 7/002 431/354 |
| 2011/0005054 A1 * | 1/2011 | Rell | F01D 25/26 29/428 |
| 2014/0060060 A1 * | 3/2014 | Bernero | F23R 3/12 60/748 |
| 2014/0123660 A1 * | 5/2014 | Stoia | F23R 3/005 60/772 |
| 2014/0230442 A1 * | 8/2014 | Yokota | F23R 3/005 60/760 |
| 2014/0345249 A1 | 11/2014 | Fukuda et al. | |
| 2016/0223202 A1 * | 8/2016 | Borchert | F23R 3/10 |
| 2017/0234226 A1 * | 8/2017 | Jones | F23R 3/28 60/757 |

* cited by examiner

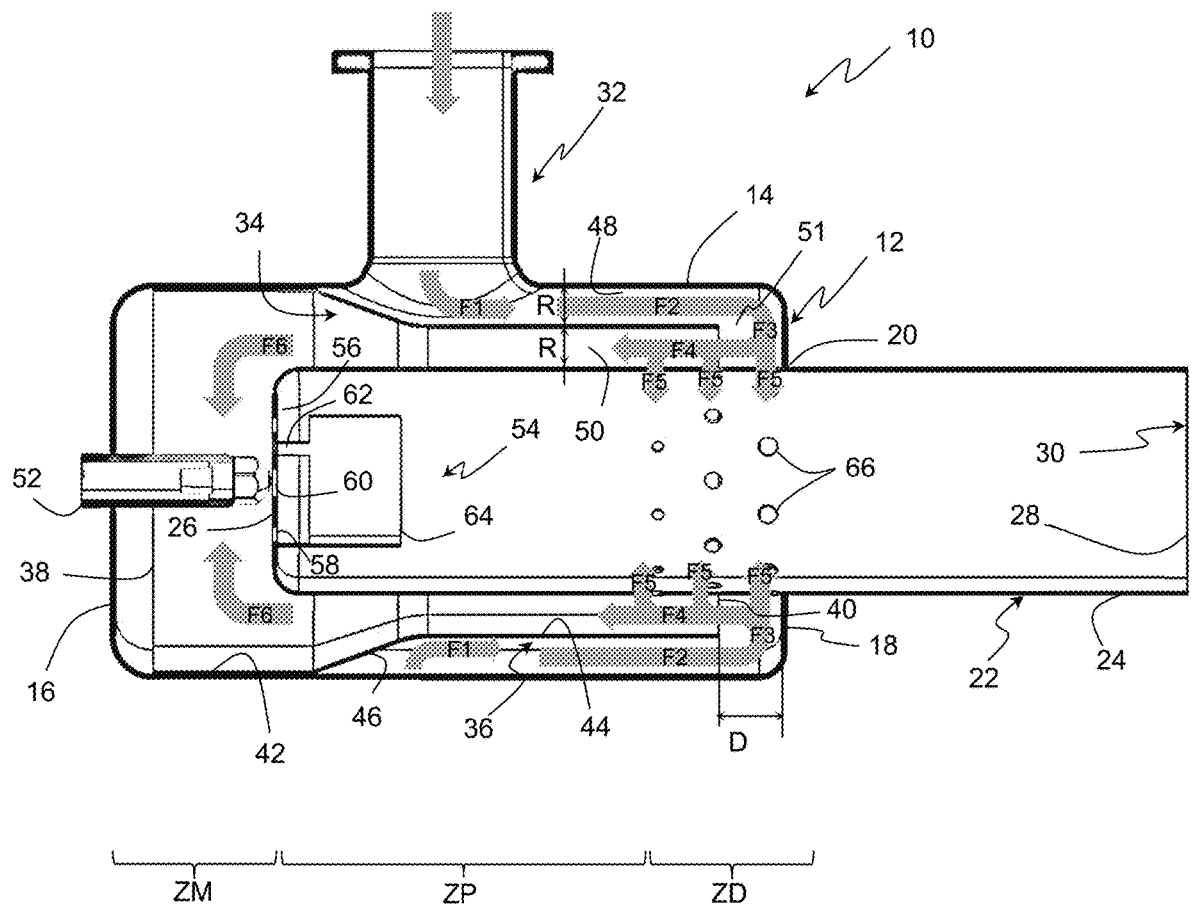

COMBUSTION CHAMBER WITH A HOT COMPRESSED AIR DEFLECTOR, IN PARTICULAR FOR A TURBINE INTENDED FOR PRODUCING ENERGY, IN PARTICULAR ELECTRICAL ENERGY

CROSS-REFERENCE TO RELATED APPLICATIONS

This application is a U.S. national phase application filed under 35 U.S.C. § 371 of International Application No. PCT/EP2017/067356, filed Jul. 11, 2017, designating the United States, which claims priority from French Patent application Ser. No. 16/57,969, filed Aug. 29, 2016, which are hereby incorporated herein by reference in their entirety.

The present invention relates to a combustion chamber of a turbine, particularly a turbine having a thermodynamic cycle with recuperator, for the production of energy, particularly electrical energy.

It relates more particularly to a micro-turbine with recuperator for the production of electricity from a liquid or gaseous fuel.

In general, what is meant by a micro-turbine is a turbine of low power usually below 200 kW.

As best described in application WO 2012/039611, a turbine with recuperator generally comprises at least one compression stage with at least one compressor, a combustion chamber (or burner), at least one expansion stage with at least one expansion turbine, a heat exchange device (or recuperator) between the compressor and the combustion chamber allowing the gases compressed by the compressor to be heated so that they can be sent at a high temperature to the combustion chamber, this exchange device having the hot gases from the turbine passing through it.

As described in French patent application No. 15/59314 in the name of the same applicant, the combustion chamber comprises a housing through which the hot compressed air coming from the recuperator circulates and a flame tube, situated inside this housing, within which combustion takes place.

The flame tube comprises a primary zone which receives some of the total hot compressed air flow rate and in which combustion takes place, and a dilution zone in which the burnt gases coming from the primary zone and the hot compressed gases coming from dilution holes provided on the tube, are mixed.

The primary zone further comprises a perforated diffuser allowing the passage of the hot compressed air and of the fuel from a (liquid or gaseous) fuel injection system positioned upstream of the diffuser.

As best described in the aforementioned application, the flame tube carries a flame stabilizer comprising the perforated diffuser, at least one combustion-gas recirculation passage, and a mixing tube.

This combustion chamber, although satisfactory, does nevertheless have some not-insignificant disadvantages.

Specifically, the compressed air is distributed in this combustion chamber as two flows. The first air flow is directed towards the primary zone where combustion takes place, whereas the second flow will enter the dilution zone directly via the dilution holes so that the mixture obtained at the outlet of the combustion chamber is homogenous in temperature and in composition.

As a result, the asymmetry of the compressed air inlet into the combustion chamber with respect to the flame tube leads to significant asymmetry in the flow of air and of burnt gases. This may cause the hot gases originating from the combustion of the fuel in the primary zone to lick the wall. These gases, which may be at very high temperatures (in excess of 1500° C.), may damage the wall of the flame tube.

This means that the life of the flame tube is very much limited unless it is made from very expensive materials.

In addition, if the flame is not correctly located within the flame tube, the effectiveness of the dilution zone is lessened and may lead to significant temperature heterogeneities at the outlet of the combustion chamber, and this could shorten the life of the turbine.

Furthermore, incomplete combustion may occur, with the risks of extinction and pollutant production.

The present invention proposes to overcome the aforementioned disadvantages with a combustion chamber that exhibits improved location of the hot zones thereby allowing the components to be more durable, the temperature at the outlet of the combustion chamber to be more homogenous, and the design to be less costly.

To this end, the present invention relates to a combustion chamber of a turbine, particularly a turbine with a thermodynamic cycle with recuperator, for producing energy, particularly electrical energy, comprising a housing with a means of injecting at least one fuel and a hot compressed air intake, the said housing housing a flame tube with a perforated diffuser for the passage of the hot compressed air and of the fuel, and a flame stabilizer, characterized in that the chamber comprises an air deflector positioned facing the compressed hot air intake in order to cause this hot air to circulate in just one axial direction starting from this hot air intake.

The air deflector may comprise a tube positioned between the housing and the flame tube.

The tube may comprise a tubular fixing portion and a tubular air-deflecting portion, of different cross sections, connected to one another by a joining portion.

The tubular fixing portion may have a diameter substantially equal to the diameter of the housing and the tubular deflecting portion may have a diameter which is greater than the diameter of the flame tube and smaller than that of the diameter of the housing.

The tubular deflecting portion may have a diameter which is substantially the mean of the diameters of the housing and of the flame tube.

The combustion chamber may comprise an air circulation passage between the deflecting portion and the housing and another air circulation passage between the said deflecting portion and the flame tube, the two passages being connected by a connecting passage.

The radial height of the circulation passages may be identical.

The other features and advantages of the invention will now become apparent from reading the following description, given solely by way of nonlimiting illustration and to which is appended the single FIGURE which is a diagram illustrating a combustion chamber according to the invention for a turbine for producing energy, particularly electrical energy.

The combustion chamber 10 illustrated in the FIGURE comprises a housing 12 of cylindrical shape with a tubular wall 14 of substantially circular cross section. This housing is closed at one of its ends by an injector-bearing partition 16 and the other of its ends by an annular partition 18 with a substantially circular opening 20.

This combustion chamber also comprises a flame tube 22, likewise of substantially cylindrical shape, housed coaxially inside the housing with a smaller diameter than the housing but of a diameter identical to that of the opening 20 of the annular partition. This tube comprises a wall 24 of substantially circular section, one end closed by a diffusion partition 26 facing and some distance away from the injector-bearing partition 16, and an open end 28 which passes through the annular partition engaging sealingly with the inside diameter of this annular partition to form the outlet 30 of this combustion chamber.

The housing on its peripheral wall 14, substantially at equal distance between the injector-bearing partition and the annular partition, bears a hot compressed air intake 32.

As is best visible in the FIGURE, an air deflector 34 is placed between the two walls 14 and 24 and facing this air intake so as to cause this hot air to circulate in just one axial direction starting from this intake.

More particularly, this deflector comprises a tube 36 open at each of its ends 38, 40. This tube may comprise a tubular fixing portion 42 and a tubular air-deflecting portion 44, of different cross section, these being connected to one another by a joining portion 46, which in this instance is frustaconical in shape.

The cross section of the larger-section tubular portion 42, which corresponds to the fixing tubular portion, has an outside diameter substantially equal to that of the inside diameter of the housing 12, whereas the cross section of the smaller-section tubular portion 44, which corresponds to the air-deflecting tubular portion, has an outside diameter which is greater than the outside diameter of the wall 24 of the flame tube 22 and smaller than that of the inside diameter of the wall 14 of the housing 12.

This deflector is housed in the combustion chamber in such a way that the tubular fixing portion 42 is housed between the injector-bearing partition 16 and the diffusion partition 26, being fixed by any known means (brazing, welding, . . . ) to the wall of the housing, that the tubular air-deflecting portion 44 substantially faces the air intake 32 and that the frustaconical portion 46 is positioned near this intake.

Advantageously, the diameter of the tubular air-deflecting portion is such that it is equivalent to the mean of the diameters of the housing 12 and of the flame tube 22. That makes it possible to create compressed-air circulation passages with the same radial height R between this portion and, respectively, the housing (passage 48) and the flame tube (passage 50).

Likewise, the open end 40 of the tubular air-deflecting portion 44 is situated some distance away from the annular partition 18 so that the distance between this open end and the partition creates a connecting passage 51 of which the axial dimension D is at least equal to the radial height R.

Thus, when compressed hot air is admitted, it circulates in the passages without any significant dimensional variation.

In the FIGURE, the injector-bearing partition bears a means for injecting at least one fuel 52, in this instance in the form of an injector coaxial with the flame tube, facing a flame stabilizer 54 which is positioned on the diffusion partition 26.

This stabilizer comprises a perforated diffuser 56 housed in a diffusion partition 26 and comprising a multitude of axial holes 58 evenly circumferentially distributed on the base and a central axial orifice 60. This base continues in an axial direction and away from the partition in the form of axial arms 62, in this instance three arms spaced 120° apart, and bearing at their ends a mixing tube 64 of limited axial extent and of an outside diameter smaller than the inside diameter of the flame tube 22.

The flame tube also comprises circumferential rows of radial dilution orifices 66 positioned some distance away from the diffusion partition and near the annular partition of the housing, advantageously being evenly distributed on each side of the free end region of the portion 44.

The combustion chamber thus formed comprises an injection/mixing zone ZM where the hot compressed air is mixed with the fuel and combustion begins, a primary zone ZP, in which combustion takes place, and a dilution zone ZD where the burnt gases coming from the primary zone and the hot compressed air from the dilution holes mix.

In operation, the fuel, here in liquid form, is injected by the injector 52 towards the diffusion partition 26 so as to pass through the central orifice 60. The hot compressed air coming from the intake 32 is deflected by the deflector 34 in the direction of the arrow F1 first of all by the frustaconical portion 46 so as to end up in the passage 48. This air circulates in an axial direction from the intake 32 and all along this passage 48 in just one direction of circulation, in this instance from left to right when considering the arrow F2, in order to arrive at the end passage 51. Having reached this passage, the air has a radial direction of circulation in the direction of the arrow F3 then circulates in the passage 50 in an opposite axial direction to its direction in the passage 48, in the direction of the arrow F4. Some of the air circulating in the passage 50 then enters the flame tube through the dilution orifices (arrow F5) and the other proportion of this air arrives in the mixing zone ZM (arrow F6). This air then passes through the holes 58 in the diffusion partition 26 and is directed into the mixing tube 64 in which the liquid fuel evaporates and then burns.

Thanks to the deflector, the flow of air originating from the intake is directed towards the opposite side to the mixing zone before returning towards this mixing zone by passing around the tubular air-deflecting portion 44.

As a result:
- the speeds at which the air arrives in the space situated in the tubular air-deflecting portion 44 are low and more symmetric (symmetry of revolution) with respect to the central axis of the tubular air-deflecting portion, thereby affording an improvement to the effectiveness of the dilution. Specifically, in each of the various rows of dilution holes 66, the speeds at which air enters the dilution zone are very similar for all the holes;
- the tubular air-deflecting portion 44, which is the hottest component, is better insulated from the outside by the double flow of air;
- the speeds of arrival in the zone situated between the diffusion partition 26 and the housing 12 are very low because of the large cross section of the mixing zone ZM and because of the relatively low flow rate (some of the total flow passes to the diffusion zone ZD). This zone behaves like a collector making it possible to have inlet speeds in the main zone ZP via the diffusion partition which are normal to the partition and which are identical for each concentric row of holes. That being the case, the flame subsequently generated in the primary zone ZP is indeed situated around the axis of the tubular air-deflecting portion.

The invention claimed is:

1. A combustion chamber of a turbine for producing energy, comprising:
   a housing bearing an injector configured to inject at least one fuel and a hot compressed air intake;
   a flame tube housed at least partially in the housing and comprising a diffusion partition for the passage of hot compressed air and the at least one fuel, and a flame stabilizer, wherein the flame stabilizer comprises a perforated diffuser housed in the diffusion partition and comprising a multitude of axial holes evenly circumferentially distributed on a base and a central axial orifice, the base continuing in an axial direction and away from the diffusion partition in the form of axial arms, ends of the axial arms bearing a mixing tube of limited axial extent and of an outside diameter smaller than a diameter of the flame tube, the flame tube comprising circumferential rows of radial dilution orifices positioned a distance away from the perforated diffuser and near an annular partition of the housing through which the flame tube passes; and an air deflector positioned facing the hot compressed air intake in order to cause the hot compressed air to circulate in the axial direction starting from the hot compressed air intake, the air deflector comprising a tube positioned between the housing and the flame tube, wherein the tube comprises a tubular fixing portion and a tubular air-deflecting portion, of different cross sections, connected to one another by a joining portion, the tubular fixing portion being attached to the housing between a portion bearing the injector and the hot compressed air intake, the tubular air-deflecting portion substantially facing the hot compressed air intake and having a free end region spaced from the annular partition of the housing through which the flame tube passes, wherein the circumferential rows of radial dilution orifices are distributed on each side of the free end region of the tubular air-deflecting portion.

2. The combustion chamber according to claim 1, wherein the tubular fixing portion has a diameter substantially equal to a diameter of the housing and the tubular air-deflecting portion has a diameter which is greater than the diameter of the flame tube and smaller than the diameter of the housing.

3. The combustion chamber according to claim 1, wherein the diameter of the tubular air-deflecting portion is substantially the mean of the diameters of the housing and of the flame tube.

4. The combustion chamber according to claim 1, wherein the tubular air-deflecting portion defines a first air circulation passage between the tubular air-deflecting portion and the housing and a second air circulation passage between the tubular air-deflecting portion and the flame tube, the first and second air circulation passages being connected by a connecting passage.

5. The combustion chamber according to claim 4, wherein the first and second air circulation passages have the same radial height.

6. A turbine for producing energy, comprising at least one compression stage with at least one gas compressor, a heat exchanger, the combustion chamber according to claim 1, and at least one expansion stage with at least one expansion turbine connected by a shaft to the at least one gas compressor.

* * * * *